United States Patent
Alvarez et al.

(10) Patent No.: US 9,316,118 B2
(45) Date of Patent: Apr. 19, 2016

(54) BEARING CHAMBER APPARATUS

(75) Inventors: Aida Alvarez, Portugalete (ES); Yi Wang, Nottingham (GB); Lee A Clark, Derby (GB)

(73) Assignee: ROLLS-ROYCE plc, London (GB)

(*) Notice: Subject to any disclaimer, the term of this patent is extended or adjusted under 35 U.S.C. 154(b) by 995 days.

(21) Appl. No.: 13/483,691

(22) Filed: May 30, 2012

(65) Prior Publication Data

US 2012/0315137 A1 Dec. 13, 2012

(30) Foreign Application Priority Data

Jun. 13, 2011 (GB) .................................. 1109799.5

(51) Int. Cl.
*F01D 25/20* (2006.01)
*F01D 25/18* (2006.01)
*F02C 7/06* (2006.01)

(52) U.S. Cl.
CPC .............. *F01D 25/18* (2013.01); *F01D 25/183* (2013.01); *F01D 25/20* (2013.01); *F02C 7/06* (2013.01); *F16C 2360/23* (2013.01); *Y02T 50/671* (2013.01); *Y10T 137/0396* (2015.04)

(58) Field of Classification Search
CPC ....... F01D 25/18; F01D 25/183; F01D 25/20; F01D 25/22; F01D 25/16; F02C 7/06; F16C 2360/23; F16C 33/66
USPC ............ 415/1, 111–113, 168.1–168.2, 168.4, 415/175–176, 229–230; 416/1, 174; 184/6.11
See application file for complete search history.

(56) References Cited

U.S. PATENT DOCUMENTS

| | | | |
|---|---|---|---|
| 4,343,591 A * | 8/1982 | Hannan et al. ................ | 415/175 |
| 4,433,539 A | 2/1984 | Norris et al. | |
| 4,441,311 A | 4/1984 | Rotondo et al. | |
| 4,497,172 A | 2/1985 | Smith | |
| 2009/0235632 A1 * | 9/2009 | Pisseloup ..................... | 60/39.08 |
| 2010/0143094 A1 * | 6/2010 | Pisseloup et al. ............. | 415/13 |

FOREIGN PATENT DOCUMENTS

EP    0786582 A2    7/1997

OTHER PUBLICATIONS

Sep. 28, 2011 Search Report issued in British Patent Application No. GB1109799.5.

* cited by examiner

*Primary Examiner* — Christopher Verdier
(74) *Attorney, Agent, or Firm* — Oliff PLC

(57) ABSTRACT

A bearing chamber apparatus (2) comprising a bearing chamber (4) having one or more seals (7) which seal an interior (5) of the chamber from an exterior (24) of the chamber; and further comprising: a pump in fluid communication with the interior of the chamber; and a controllable valve (20) in fluid communication with the interior of the chamber and the outside atmosphere. The arrangement allows oil leakage from the bearing chamber to be prevented and also allows a minimum pressure to be maintained within the bearing chamber.

15 Claims, 4 Drawing Sheets

BEARING CHAMBER APPARATUS

The present invention relates to a bearing chamber apparatus and particularly, but not exclusively, to an apparatus for use in a gas turbine engine to prevent leakage of oil from a bearing chamber.

Gas turbine engines typically include one or more shafts supported on bearings. The bearings are housed in bearing chambers which allow lubricating oil to be introduced around the bearings. There may also be other rotating elements within the bearing chamber that need oil for lubrication and cooling; e.g. a gear mesh for power offtake or transfer. In this specification, it is not necessary to distinguish between these different sorts of rotating elements and so for simplicity "bearings" is used as a generic term for all types of rotating element that need oil for lubrication and cooling. To prevent the lubricating oil from leaking from the bearing chambers, seals are provided between the chamber and the shaft. There will be fluid communication between the bearing chamber and the region surrounding it, via these seals, and there may also be additional fluid flow paths through the static joints of the bearing chamber. In this specification, where it is not necessary to distinguish between these two types of flow path, they will be referred to by the generic name "leakage paths" to indicate either or both.

It is usually arranged that, under normal operating conditions, the pressure outside a bearing chamber is slightly higher than the pressure within it. This differential pressure, referred to in this specification as a "positive pressure differential", ensures that there is a continuous flow of air inwards through the leakage paths, which prevents oil from exiting the bearing chamber. However, under certain operating conditions (both steady-state and transient) the pressures inside and outside a bearing chamber may change so that the differential pressure across the leakage paths is reversed. In these circumstances, oil will tend to pass through the leakage paths and out of the bearing chamber.

Any oil that does leak out of a bearing chamber may cause engine fire and hence a hazard for safe engine operation. It may also contaminate the core air flow of the engine. When gas turbine engines are installed in aircraft, typically a proportion of the core air flow is taken to supply breathable air for the crew and passengers. The "cabin odour" arising out of this sort of contamination has long been recognised as undesirable. However, in recent years it has become increasingly clear that contaminated cabin air may also represent a serious health and safety hazard. Furthermore, oil in the core air flow may cause smoke in the cabin which may, understandably, cause alarm among passengers.

To prevent oil from leaking from the bearing chamber, the bearing chamber may be vented to provide an alternative route for air to exit the bearing chamber. For example, the bearing chamber may be vented to the atmosphere outside of the engine.

U.S. Pat. No. 4,433,539 discloses an apparatus which allows the pressure within the bearing chamber to be controlled using a breather pipe. The breather pipe has a valve which can be controlled to prevent or permit air to exit the bearing chamber. By doing so, the pressure in the chamber is controlled so that the pressure outside of the chamber is higher than the pressure inside the chamber. The control of the valve is responsive to the speed of the engine. However, this arrangement is not able to maintain the positive pressure differential across the seals if the pressure surrounding the bearing chamber is lower than the atmospheric pressure outside the engine. In addition, the breather pipe and valve may not allow sufficient air to exit the bearing chamber during an abrupt change in engine speed. Consequently, a pressure reversal may still occur, which will result in the leakage of oil.

Alternatively, the positive differential pressure across the leakage paths may be created by bleeding air from the engine compressor which has a sufficiently high pressure, and supplying the air to the outside of the bearing chamber to prevent oil escaping from the bearing chambers and contaminating the air apparatus in the engine.

However, the air from the compressor is heated by the compression process, and using this air to prevent oil leakage increases the temperature of the oil within the bearing chamber. This is undesirable since it reduces the life of the bearings and may even result in an oil fire. In addition, heat is generated by friction between the air and the rotating components of the bearing chamber. This friction, and the heat generated, is proportional to the pressure of the air.

Consequently, it is desirable to use air for bearing chamber sealing which has undergone the least amount of compression in the engine compressor in order to minimise the temperature and pressure of the air and, hence, minimise the heat imparted to the oil in the bearing chamber. However, the pressure of this air often is not sufficient to cover all engine operation conditions; resulting in risk of potential pressure reversal. To prevent the pressure-reversal condition, it is necessary to use air from a later stage of the compressor which has sufficiently high pressure throughout the flight cycle. This leads to a high amount of heat being imparted to the oil within the bearing chamber as a result of the high pressure and temperature of the air used. Accordingly, this may be detrimental to the engine performance due to the loss of work from the compressor on the air and the additional weight (and cost) of an engine heat management system to prevent oil degradation from the high heat imparted to the oil.

U.S. Pat. No. 4,497,172 discloses an apparatus which uses both a relatively low pressure supply of air and a relatively high pressure supply of air. Under normal operating conditions, the low pressure supply of air is sufficient to provide air flows into the bearing chamber so as to prevent oil from leaking from the bearing chamber. However, a sensor is provided to detect when a pressure-reversal condition is imminent and to switch to the high pressure supply of air to prevent the pressure-reversal condition from occurring. Although, this apparatus avoids the pressure-reversal condition, piping and a buffer arrangement is needed to enable the switching of the air supply. This may reduce engine performance due to the additional weight (and cost) of the pipes and buffer arrangement.

The present invention seeks to provide a bearing chamber apparatus which overcomes some or all of the problems described above.

In accordance with a first aspect of the present invention, there is provided a bearing chamber apparatus comprising a bearing chamber having one or more seals which seal an interior of the chamber from an exterior of the chamber; and further comprising a pump in fluid communication with the interior of the chamber and a controllable valve in fluid communication with the interior of the chamber and the outside atmosphere.

In use, the pump and the valve may be operated to maintain a positive pressure differential exceeding a predetermined value between the exterior and the interior of the chamber by evacuating a fluid from the chamber.

The predetermined value of the positive pressure differential may be less than or equal to 0.5 psid. In a particular preferred embodiment, the predetermined value of the positive pressure differential is in the range 0.01 to 0.5 psid.

Leakage paths may exist between the interior and the exterior of the bearing chamber, and the positive pressure differential may prevent a second fluid from escaping from the chamber through the leakage paths.

The fluid may be different from the second fluid. Preferably, the fluid is air or air and oil mixture and the second fluid is oil.

In use, the pump and the valve may be operated to maintain the bearing chamber pressure above a predetermined minimum value. The minimum value may be at least 1 psia and preferably is at least 2 psia.

A vent pump may be connected to a vent line, the vent line being in fluid communication with the interior of the bearing chamber, and the valve may be a bypass valve connected to the vent line which, when open, bypasses the vent pump.

A scavenge pump may be connected to a scavenge line, the scavenge line being in fluid communication with the interior of the bearing chamber.

In accordance with a second aspect of the present invention, there is provided a method of preventing oil leakage from a bearing chamber in a gas turbine engine, the bearing chamber having leakage paths between an interior of the chamber and an exterior of the chamber, the method comprising the steps of: providing one or more pumps in fluid communication with the interior of the chamber; providing a controllable valve in fluid communication with the interior of the chamber; operating the pump and the valve to maintain a positive pressure differential exceeding a predetermined value between the exterior and the interior of the chamber so that air is drawn into the bearing chamber through the leakage paths.

The method may further include the steps of: providing a vent pump (12) connected to a vent line (10), the vent line being fluidically coupled to the interior of the bearing chamber, the valve being connected to the vent line so as to bypass the vent pump when open; closing the valve when the pressure at the exterior of the bearing chamber is lower than a discharge pressure of the vent line, so that the vent pump operates to reduce the pressure within the bearing chamber.

The method may further include the step of: opening the valve when the pump demands more flow than that flowing through the leakage paths, so that air flows into the bearing chamber through the vent line.

In accordance with a third aspect of the present invention, there is provided a method of maintaining a minimum pressure in a bearing chamber, the method comprising the steps of: providing one or more pumps in fluid communication with the interior of the chamber; providing a controllable valve in fluid communication with the interior of the chamber; operating the pump and the valve to maintain the pressure within the chamber at or above the minimum.

The operating step may comprise opening the valve when the pressure within the chamber falls below the minimum pressure.

The minimum pressure may be at least 1 psia and preferably is at least 2 psia.

By evacuating the fluid from the bearing chamber, the pressure in the chamber may be reduced. This may be achieved in two operational scenarios.

In the first scenario, when the pressure surrounding the bearing chamber is lower than the pressure at a fluid discharge position, the bypass valve in the vent line may be controlled to be in the closed position and the fluid is pumped out of the bearing chamber via the scavenge pump and the vent pump. The suction of the pumps may maintain the bearing chamber at a lower pressure than the pressure surrounding the bearing chamber, regardless of the discharge pressure. The pumps may raise the pressure of the pumped fluid to above the discharge pressure at the pump outlet so that the fluid can be discharged to the desired fluid discharge location, where the pressure may be at or higher than atmospheric pressure.

In the situation when the pumps demand higher flow than that flowing through the leakage paths, the bypass valve may be opened to allow reversed flow through the vent line, to maintain the chamber pressure above a predetermined value. This may be controlled by software, based on engine operational parameters or pressure measurement within the chamber, or achieved passively by utilising the pressure difference from the fluid discharge location to the interior of the bearing chamber.

In the second scenario, the pressure surrounding the bearing chamber is higher than both the pressure inside the bearing chamber and the fluid discharge pressure. Here, the bypass valve may be controlled to be in the open position to enable the fluid, being driven by the pressure in the bearing chamber, to flow through the vent line in the least resistant manner. In the situation where the pumps demand higher flow than that flowing through the leakage paths, the flow through the vent line reverses to prevent the chamber pressure from being reduced below a predetermined value by the action of the pumps.

Both scenarios may avoid a pressure-reversal condition and thus prevent oil leakage. The arrangement also allows the chamber pressure to be maintained above a predetermined value, for example to avoid problems with pump cavitation. The arrangement allows a bearing chamber to be sealed using air which has undergone a minimum amount of compression. This may be advantageous over an arrangement which increases the air pressure outside the chamber, since reducing the compression of the air used for bearing chamber sealing may reduce the temperature within the chamber and reduce the frictional heat generated as a result of the pressure.

For a better understanding of the present invention, and to show more clearly how it may be carried into effect, reference will now be made, by way of example, to the accompanying drawings, in which.

Figure 1:
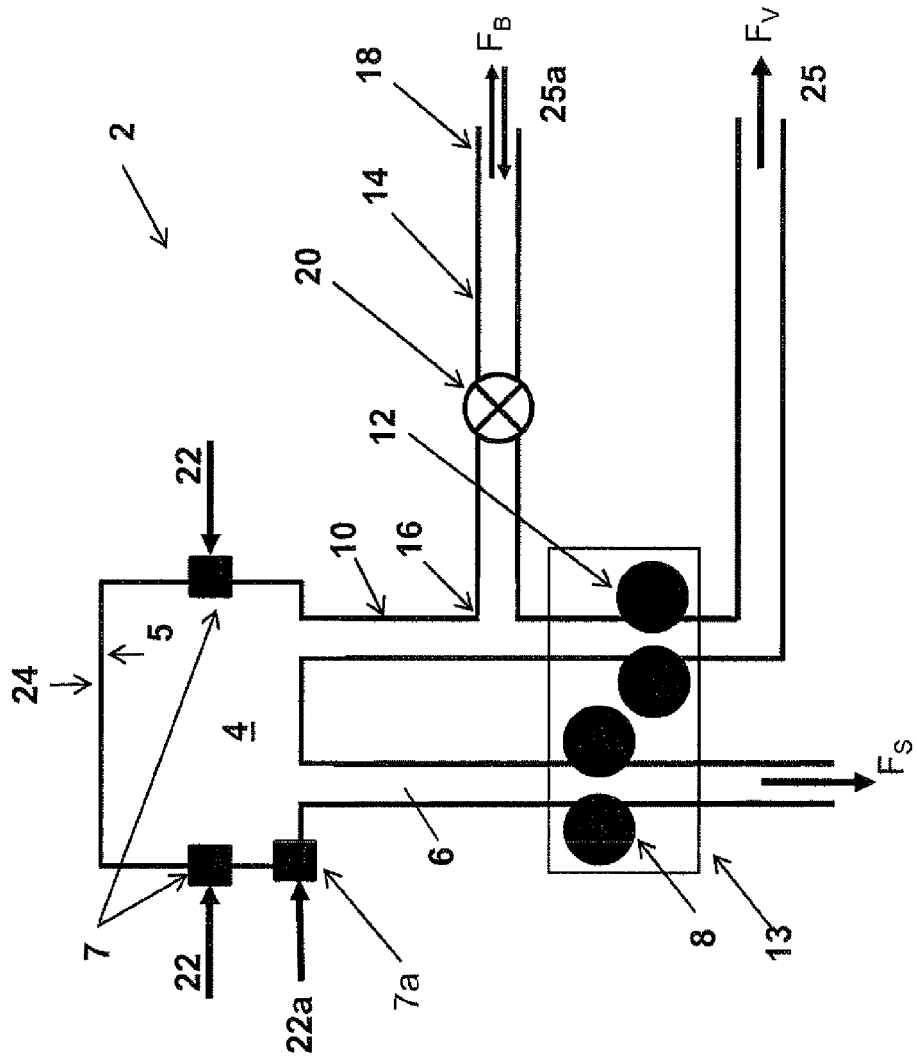
FIG. 1 is a schematic view of a bearing chamber apparatus according to an embodiment of the invention.

With reference to FIG. 1, a bearing chamber apparatus 2 according to a first embodiment of the invention comprises a bearing chamber 4. The bearing chamber 4 comprises one or more bearings (not shown) which support rotating shafts (not shown) of a gas turbine engine.

The bearings are lubricated by a lubrication system (not shown). The lubrication system is a recirculatory system which supplies lubricating oil from an oil tank to the bearing chamber 4. The lubrication system provides a film of oil over the bearings to reduce friction and to dissipate heat from the bearings.

The bearing chamber apparatus 2 further comprises a scavenge line 6 which is in fluid communication with an interior 5 of the bearing chamber 4. After lubricating the bearings the oil mixes with air in the bearing chamber 4 and the air and oil mixture is pumped back to the oil tank via the scavenge line 6. The air and oil mixture is pumped along the scavenge line 6 using a scavenge pump 8, as shown by the arrow F.

The air and oil mixture pumped back to the oil tank by the scavenge pump 8 must be deaerated and the oil needs to be cooled before being recirculated to the bearing chamber 4.

To prevent the lubricating oil from exiting the bearing chamber 4, one or more seals 7 are provided. The seals 7 prevent oil from passing between rotating and static elements of the bearing chamber 4. In the present embodiment, contacting carbon seals 7 are provided between the rotating elements of the bearing chamber 4. Other types of seal may be used, such as labyrinth seals, elastomeric seals, air riding carbon seals, or lip seals.

As mentioned previously, there may also be fluid communication between the bearing chamber 4 and the region surrounding it, via additional flow paths 7a through the static joints of the bearing chamber. These additional flow paths may arise as a result of engine deterioration or wear, or as a result of maintenance activities. Because of this, the flows 22a through these additional flow paths 7a may vary during the course of the engine's life cycle.

The bearing chamber apparatus 2 further comprises a vent line 10 which is in fluid communication with the interior 5 of the bearing chamber 4. The vent line 10 vents the bearing chamber 4 to the atmosphere, outside the gas turbine engine, as shown by the arrow $F_V$. The vent line 10 may vent the bearing chamber 4 to the atmosphere via an engine breather (not shown) in order to recover the oil from the discharged air and oil mixture. The vent line 10 is provided with a vent pump 12 which provides suction to the interior 5 of the bearing chamber 4.

A bypass line 14 is fluidically coupled to the vent line 10. A first end 16 of the bypass line 14 is connected to the vent line 10 at a position between the bearing chamber 4 and an inlet of the vent pump 12. A second end 18 of the bypass line 14 is at a location with a discharge pressure 25a.

A controllable valve 20 is provided in the bypass line 14, between the first end 16 and the second end 18. When the valve 20 is set to be in an open position, fluid can flow through the bypass line 14 in either direction, as shown by the arrow $F_B$, thus bypassing the vent pump 12. When the valve 20 is set to be in a closed position, fluid is prevented from passing through the bypass line 14 and is therefore routed through the vent pump 12. The valve 20 is controlled either passively, by the pressure difference between the discharge pressure 25a and the pressure within the bearing chamber 4, or actively using software.

In use, a feed of air is passed over an exterior 24 of the bearing chamber 4. The feed of air is bled from the core flow of gas through the engine. In the present embodiment, the air is bled from the fifth stage of the intermediate-pressure (IP) compressor; however, alternative sources may be used depending on the engine and operating conditions.

The vent pump 12 evacuates air from the interior 5 of the bearing chamber 4, thus reducing the pressure in the bearing chamber 4. The vent pump 12 is configured to reduce the pressure in the bearing chamber 4 below the pressure outside the bearing chamber 4. This produces a positive pressure differential between the exterior 24 and interior 5 of the bearing chamber 4, such that air is drawn into the bearing chamber 4 through the seals 7 (indicated by arrows 22) and through the additional flow paths 7a (indicated by arrows 22a). This flow of air into the bearing chamber 4 prevents oil from leaking outwards through the leakage paths and thus avoids contamination of the core air flow which may cause cabin odour.

At lower power conditions (e.g. ground idle and certain low-altitude and low forward speed flight idle operation conditions), the pressure at the exterior 24 of the bearing chamber 4 may be lower than a discharge pressure 25 of the vent line 10 and a discharge pressure 25a of the bypass line 14, and the pump 12 must therefore pump sufficient air from the chamber 4 to maintain a lower pressure at the interior 5 of the bearing chamber than at the exterior 24 of the bearing chamber 4. In this condition, the valve 20 is kept in the closed position so that the pressure at the interior 5 of the bearing chamber 4 is not affected either by the discharge pressure 25 or by the discharge pressure 25a, and the pump 12 can reduce the pressure in the bearing chamber 4 to be lower than the pressure at the exterior 24 of the bearing chamber 4.

Under some operating conditions, the scavenge pump 8 and vent pump 12 may demand more flow than that flowing through the leakage paths. This may lead to a large pressure differential across the seals 7 and a low pressure in the interior 5 of the bearing chamber 4. The large pressure differential across the seals 7 may cause damage to the seals 7 and the low pressure within the bearing chamber 4 may cause cavitation of the scavenge and vent pumps 8 and 12. Therefore, the valve 20 is set to the open position under such conditions so as to allow the fluid to flow in the reverse direction along the vent line 10 via the bypass line 14 and into the bearing chamber 4. By increasing the pressure within the bearing chamber 4, this minimises the pressure differential across the seals 7, thus prolonging their lives, and avoids cavitation in the scavenge and vent pumps 8, 12. The valve 20 is opened either actively, by software based on engine operational parameters or pressure measurement within the chamber, or passively by the pressure difference between the discharge pressure 25a and the pressure inside the bearing chamber 4, to ensure that the pressure in the interior 5 of the bearing chamber 4 is maintained above a predetermined value. With the valve 20 open, air can flow into the bearing chamber 4 through the bypass line 14 to meet the flow demands of the scavenge and vent pumps 8, 12. The valve 20 and the bypass line 14 are designed such that they have a sufficient pressure drop when air flows into the bearing chamber via the bypass line 14.

However, where the engine is operating at a higher power, such that the surrounding pressure at the exterior 24 of the bearing chamber 4 is also increased to be higher than either the discharge pressure 25 or the discharge pressure 25a, the pressure differential across the leakage paths 7, 7a resultant from the suction of the scavenge and vent pumps 8, 12 may be too small to prevent oil leaking through the leakage paths due to the limitation from the fixed capacity of the pumps. Accordingly, when the engine operation exceeds a certain power level, the valve 20 is set to the open position to allow the fluid in the bearing chamber 4 to flow outwards through the vent line 10 via the bypass line 14 without restriction from the pump 12.

At certain operational conditions, such as high power or idle in flight, the surrounding pressure at the exterior 24 of the bearing chamber 4 is higher than either the discharge pressure 25 or the discharge pressure 25a, and the airflow inwards to the bearing chamber 4 through the leakage paths is small. This may lead to a large pressure differential across the seals 7 and a low pressure in the interior 5 of the bearing chamber 4. The large pressure differential across the seals 7 may cause damage to the seals 7 and the low pressure within the bearing chamber 4 may cause cavitation of the scavenge and vent pumps 8 and 12. Therefore, the valve 20 is set to the open position during such engine operation conditions so as to allow the fluid to flow in the reverse direction along the vent line 10 via the bypass line 14 and into the bearing chamber 4. By increasing the pressure within the bearing chamber 4, this minimises the pressure differential across the seals 7 and thus prolongs the life of the seals 7 and the scavenge and vent pumps 8, 12.

The valve 20 is configured to ensure that the pressure in the bearing chamber 4 is always lower than pressure outside the chamber 4 and thus prevents oil from leaking out of the bearing chamber 4. Furthermore, the valve 20 is configured to maintain the positive pressure differential above a predetermined minimum level so as to reduce wear of the seals 7 and to avoid cavitation of the scavenge and vent pumps 8, 12.

Figure 2:
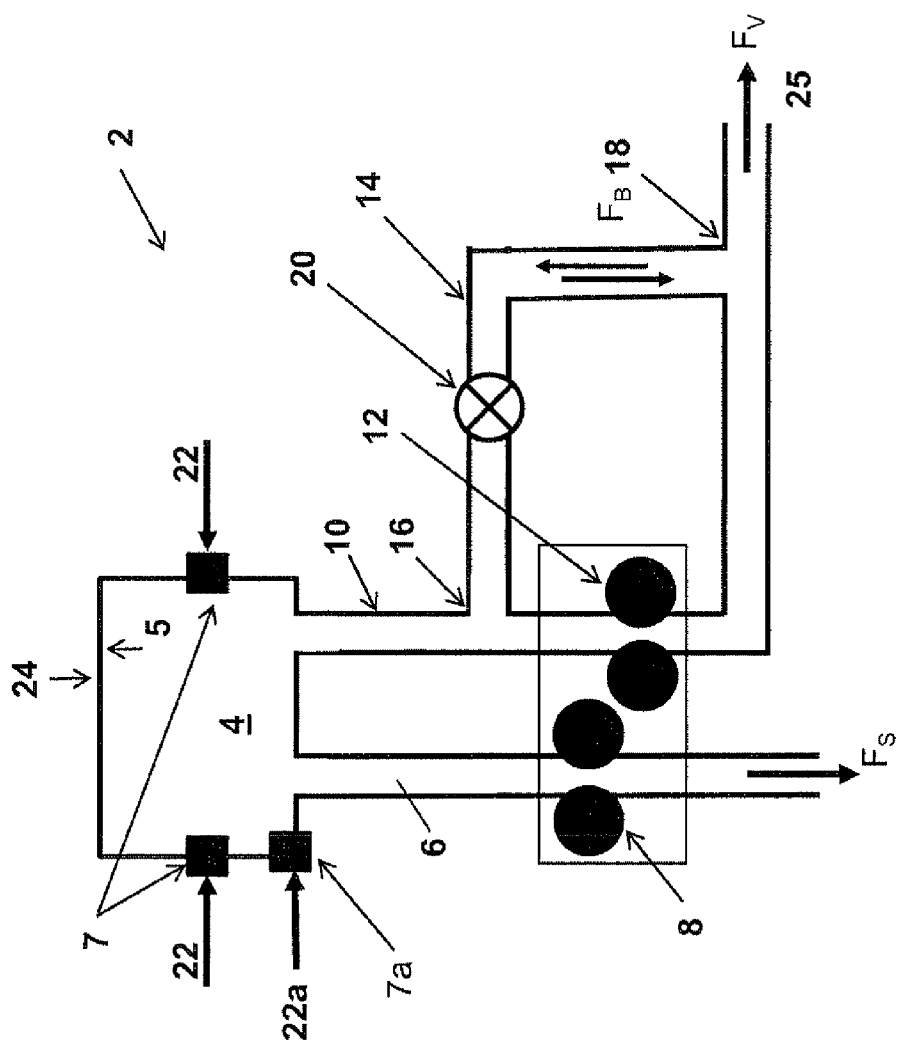
FIG. 2 is a schematic view of a bearing chamber apparatus according to a second embodiment of the invention.

FIG. 2 shows a second embodiment of the invention. Many elements are the same as in FIG. 1 and are indicated by the same reference numbers.

The most significant difference in the embodiment of FIG. 2 is that the second end 18 of the bypass line 14 is connected to the vent line 10 downstream of the vent pump 12, so that the vent pump 12 lies between the first end 16 and the second end 18 of the bypass line. The operation of this embodiment is exactly the same as for the embodiment of FIG. 1, as explained above, with the exception that in this case the discharge pressure 25*a* will effectively be equal to the discharge pressure 25. The advantage of this embodiment is to minimise the pipe route, hence saving engine weight and cost.

Figure 3:
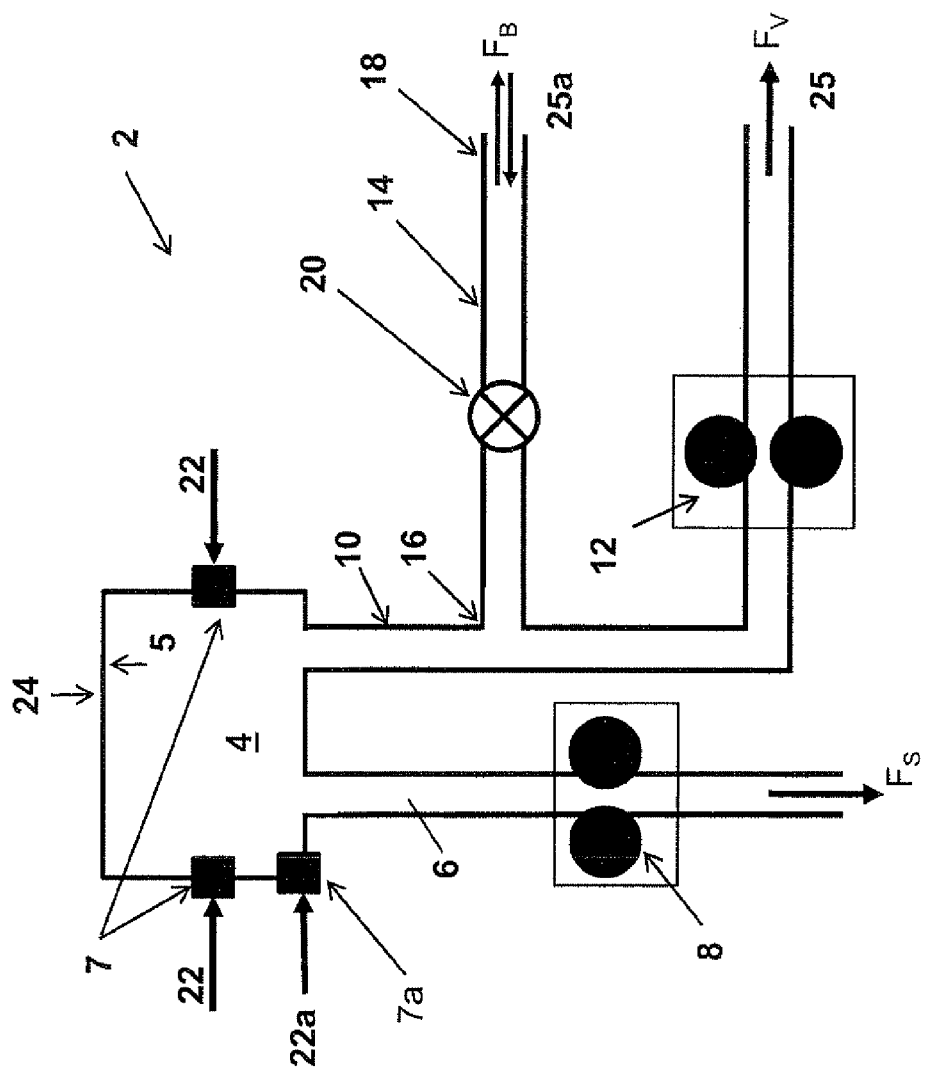
FIG. 3 is a schematic view of a bearing chamber apparatus according to a third embodiment of the invention.
Figure 4:
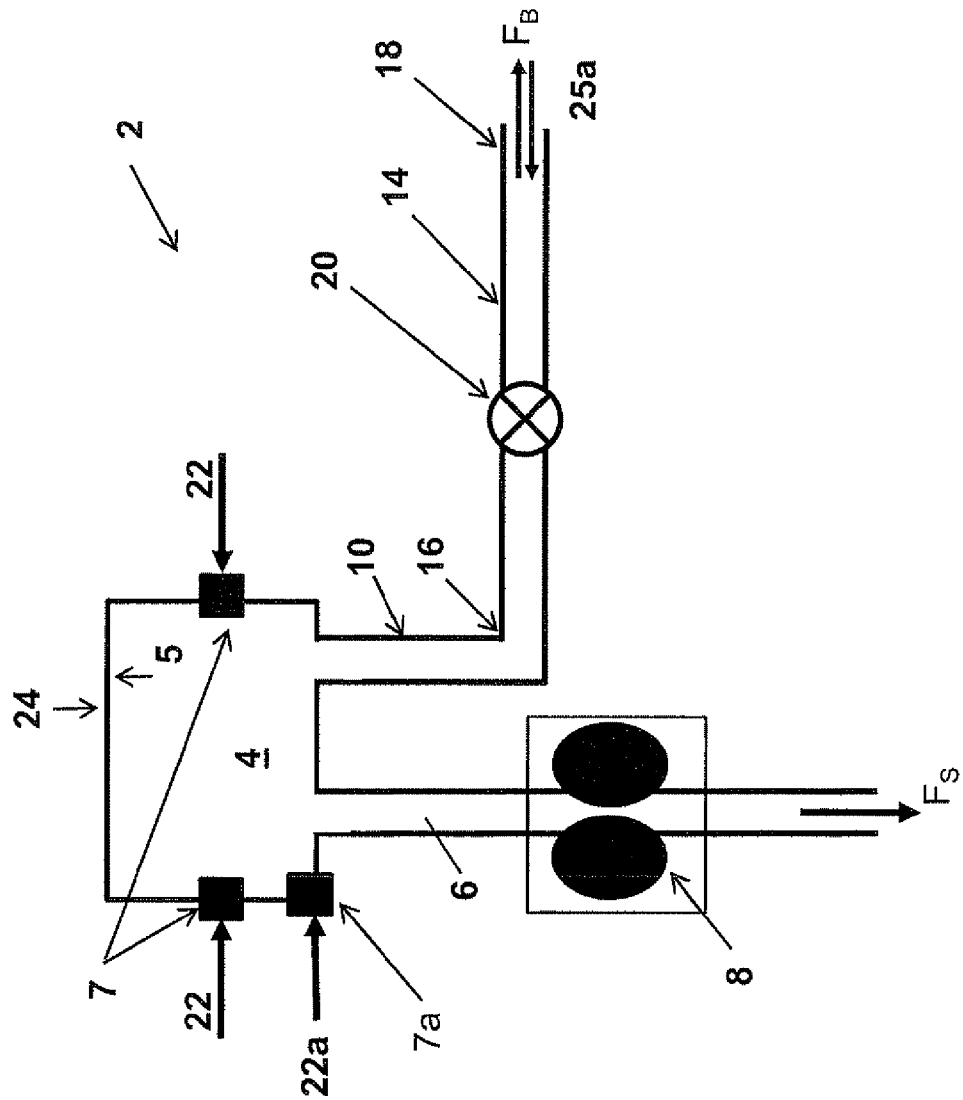
FIG. 4 is a schematic view of a bearing chamber apparatus according to a fourth embodiment of the invention.

Further alternative embodiments of the invention are illustrated in FIGS. 3 and 4. Many elements are the same as in FIG. 1 and are identified by the same reference numbers.

In the embodiment of FIG. 1, the scavenge pump 8 and vent pump 12 were located in a common housing 13. By providing only one housing, the weight of the assembly may be reduced. FIG. 3, by contrast, shows an alternative embodiment in which the scavenge pump 8 and vent pump 12 are each provided with their own housing. In this way, installation of the pumps may be eased, because they need not be located together. Furthermore, there are fewer restrictions on the configuration of the pumps, for example the type of scavenge pump used.

FIG. 4 illustrates a further embodiment in which the scavenge pump 8 capacity is increased so that the suction from this pump alone is sufficient to maintain the positive pressure differential from the exterior to the interior of the bearing chamber 4. The function and operation of the valve 20 and the bypass line 14 remain unchanged, but a separate vent pump is no longer required.

It will be appreciated that further embodiments of the invention are possible, and that modifications may be made to the described embodiments without departing from the scope of the invention. In particular, it is possible to operate the pump and valve so as to maintain the positive pressure differential and the minimum bearing chamber pressure both together, or to focus the control on one or the other.

The invention claimed is:

1. A bearing chamber apparatus comprising a bearing chamber having one or more seals which seal an interior of the chamber from an exterior of the chamber; and further comprising:
   a pump in fluid communication with the interior of the chamber; and
   a controllable valve in fluid communication with the interior of the chamber and the outside atmosphere,
   wherein a vent pump is connected to a vent line, the vent line being in fluid communication with the interior of the bearing chamber, and wherein the valve is a bypass valve connected to the vent line which, when open, bypasses the vent pump.

2. A bearing chamber apparatus as claimed in claim 1, wherein, in use, the vent pump and the valve are operated to maintain a positive pressure differential exceeding a predetermined value between the exterior and the interior of the chamber by evacuating a fluid from the chamber.

3. A bearing chamber apparatus as claimed in claim 2, wherein the predetermined value of the positive pressure differential is less than or equal to 0.5 psid.

4. A bearing chamber apparatus as claim in claim 3, wherein the predetermined value of the positive pressure differential is in the range 0.01 to 0.5 psid.

5. A bearing chamber apparatus as claimed in claim 2, wherein leakage paths exist between the interior and the exterior of the bearing chamber, and the positive pressure differential prevents a second fluid from escaping from the chamber through the leakage paths.

6. A bearing chamber apparatus as claimed in claim 5, wherein the fluid is different from the second fluid.

7. A bearing chamber apparatus as claimed in claim 5, wherein the second fluid is oil.

8. A bearing chamber apparatus as claimed in claim 2, wherein the fluid is air or air and oil mixture.

9. A bearing chamber apparatus as claimed in claim 1, wherein, in use, the pump and the valve are operated to maintain the bearing chamber pressure above a predetermined minimum value.

10. A bearing chamber apparatus as claimed in claim 9, wherein the minimum value is at least 1 psia.

11. A bearing chamber apparatus as claimed in claim 9, wherein the minimum value is at least 2 psia.

12. A bearing chamber apparatus as claimed in claim 1, wherein the pump is a scavenge pump that is connected to a scavenge line, the scavenge line being in fluid communication with the interior of the bearing chamber.

13. A gas turbine engine comprising a bearing chamber apparatus as claimed in claim 1.

14. A method of preventing oil leakage from a bearing chamber in a gas turbine engine, the bearing chamber having leakage paths between an interior of the chamber and an exterior of the chamber, the method comprising the steps of:
   providing one or more pumps in fluid communication with the interior of the chamber;
   providing a controllable valve in fluid communication with the interior of the chamber;
   operating the pump and the valve to maintain a positive pressure differential exceeding a predetermined value between the exterior and the interior of the chamber so that air is drawn into the bearing chamber through the leakage paths;
   providing a vent pump connected to a vent line, the vent line being in fluid communication with the interior of the bearing chamber, the valve being connected to the vent line so as to bypass the vent pump when open; and
   closing the valve when the pressure at the exterior of the bearing chamber is lower than a discharge pressure of the vent line, so that the vent pump operates to reduce the pressure within the bearing chamber.

15. A method as claimed in claim 14, and further including the step of:
   opening the valve when the pump demands more flow than that flowing through the leakage paths, so that an air and oil mixture flows into the bearing chamber through the vent line.

* * * * *